G. E. FISHER.
PINEAPPLE MEAT ERADICATOR.
APPLICATION FILED JUNE 25, 1917.

1,369,231.

Patented Feb. 22, 1921.
3 SHEETS—SHEET 1.

Inventor.
George Edwin Fisher,

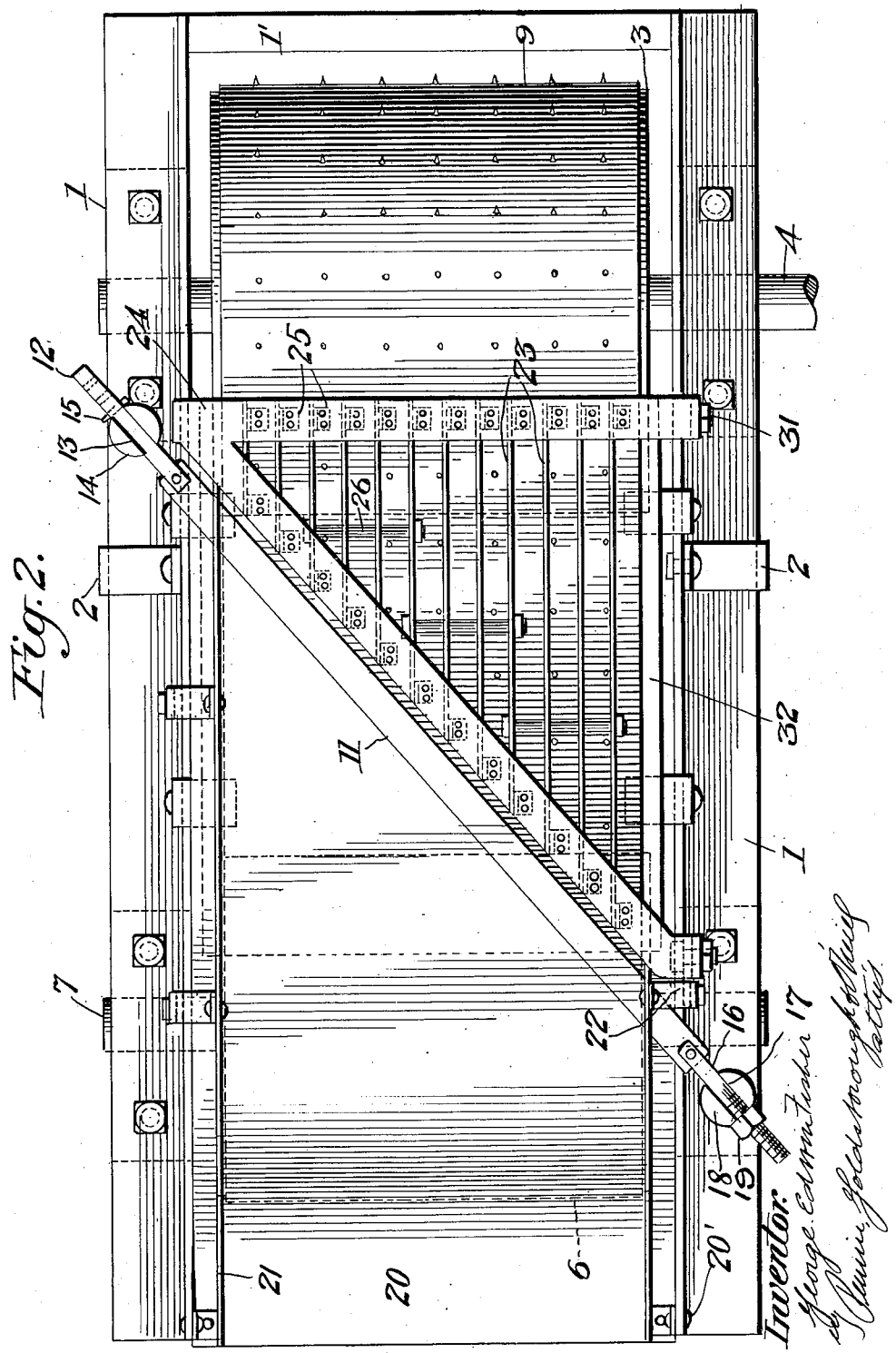

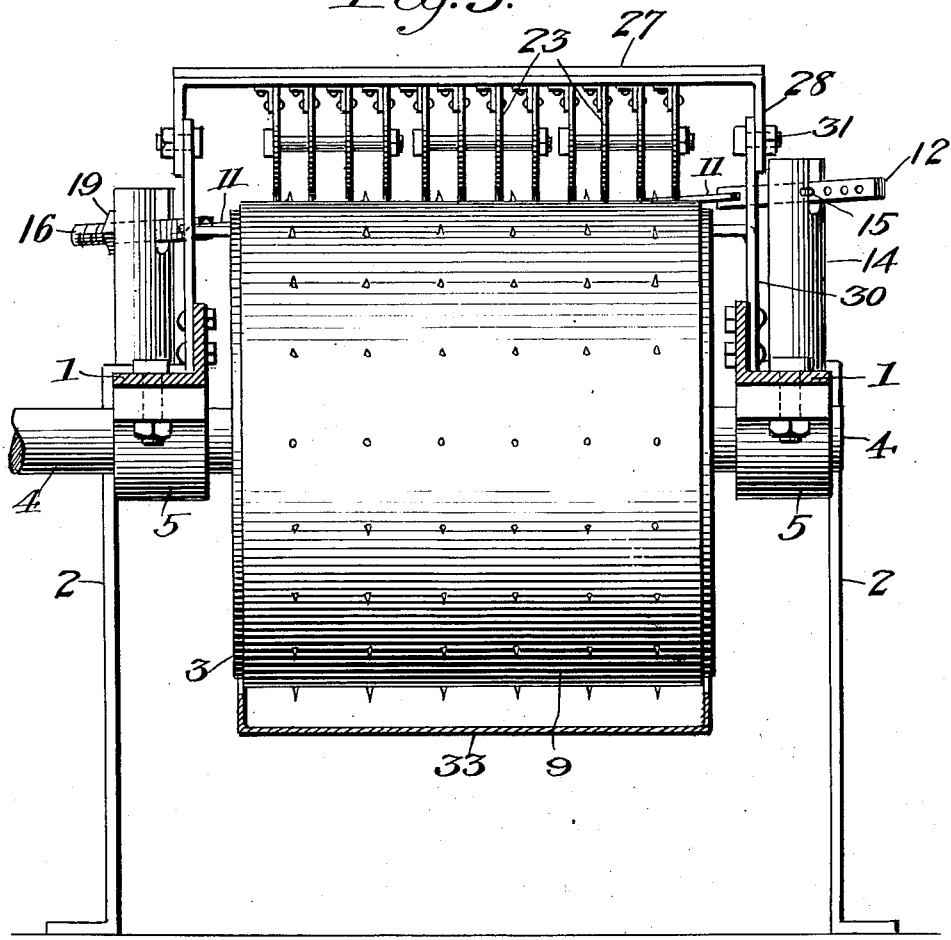

UNITED STATES PATENT OFFICE.

GEORGE EDWIN FISHER, OF HONOLULU, TERRITORY OF HAWAII, ASSIGNOR TO HAWAIIAN PINEAPPLE COMPANY, LIMITED, OF HONOLULU, TERRITORY OF HAWAII.

PINEAPPLE-MEAT ERADICATOR.

1,369,231.                Specification of Letters Patent.      Patented Feb. 22, 1921.

Application filed June 25, 1917. Serial No. 176,790.

*To all whom it may concern:*

Be it known that I, GEORGE EDWIN FISHER, a citizen of the United States, and a resident of the city of Honolulu, Territory of Hawaii, U. S. A., have invented certain new and useful Improvements in Pineapple - Meat Eradicators; and I do hereby declare the following to be a full, clear, and exact description of the invention, such as will enable others skilled in the art to which it appertains to make and use the same.

This invention relates to a machine for removing the meat from the shells of pineapples after the usual cylinder of meat has been removed therefrom.

It is the practice, in preparing pineapples for the market, to cut the ends off of the same, and then cut a cylinder from the meat of the pineapple from which the core is removed, and which cylinder forms a marketable product. The shell which is a by-product of this operation contains, on the inside, a considerable amount of meat which has, in practice, been removed by various devices, all of which, however, entail the splitting and flattening of the shell and the removal of the meat therefrom by the passage of the shell with the meat side down through a machine. The meat is, in effect, grated from the shell by numerous knives, and owing to the arrangement of the shell with the meat side down, any eyes and particles which are pulled or dropped from the shell pass with the meat, so that ultimately a dirty and unsatisfactory product results.

It is an object of the present invention to remove the meat from the shell in a large piece, in such manner that the product will be practically free from eyes, pieces of shell, dirt or the like. This is accomplished, broadly, by removing the meat from the flattened shell, while the shell is passed through the machine with the meat side up, by means of a stationary knife. The meat is, in effect, cut and lifted from the shell while the shell is permitted to fall away from the meat.

Other objects of the invention will appear as the description progresses, and it is, therefore, not deemed necessary to enumerate the objects in detail.

In the drawings:—

Fig. 2 is a plan view of the same with the cover plate removed; and

Fig. 3 is a vertical sectional view looking at the feed end of the machine, on line 3—3 of Fig. 1.

Figure 1:
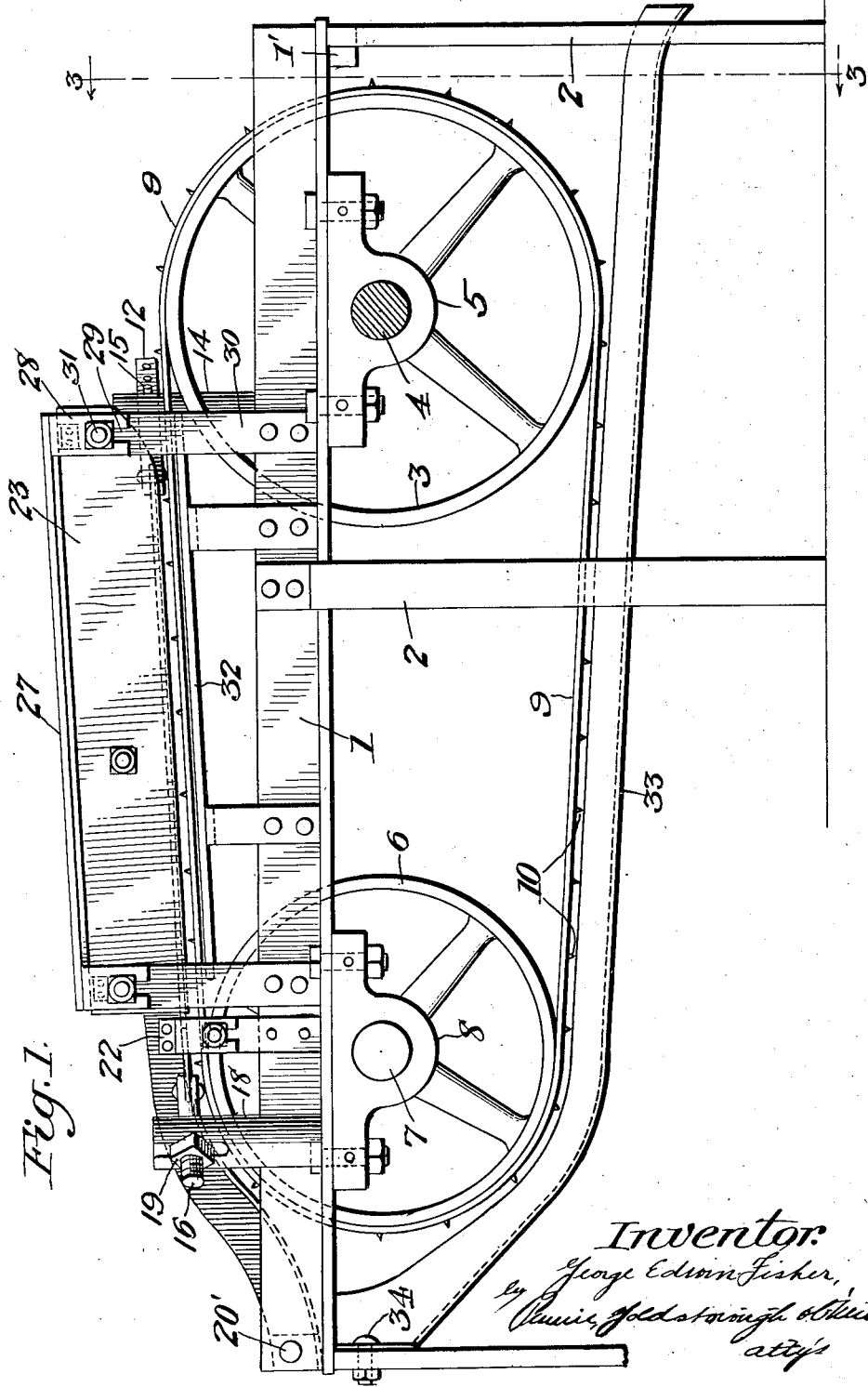
Figure 1 is a side elevation of a machine embodying the invention.

The embodiment of the invention illustrated in the drawings consists of a bed comprising a pair of spaced angular side bars 1 and cross bars 1', which are supported by suitable legs 2. At the feed end of the machine, a drum 3 is supported on a drive shaft 4, which shaft is, in turn, mounted in a bearing 5 and may be, if desired, extended and used as a common drive shaft for a battery of machines. Adjacent to the discharge end of the machine, a second and relatively smaller drum 6 is mounted on a shaft 7, which is rotatable in suitable bearings 8. A conveyer belt 9, by means of which the flattened pineapple shells are fed to the cutting knife, passes around these drums 3 and 6 and is provided with a plurality of outstanding spurs 10. The upper lap of this belt moves from the drum 3 to the drum 6 and inclines downwardly toward the latter.

Arranged above the belt 9 and extending transversely across the same, is a knife 11, one end of which is provided with a rectangular tie bar 12 which extends through a vertical slot 13 in a post 14, which latter extends upwardly from one of the side bars 1 of the bed. This tie bar 12 is provided with a plurality of transverse openings, through any one of which a pin 15 is adapted to extend, which contacts with the post 14 and prevents the longitudinal movement of the knife in one direction. On the other end of the knife, a similar tie bar 16 is connected, which extends through a slot 17 in the post 18. The end of this bar 16 is, however, threaded and provided with a nut 19, so that the knife may be raised or lowered or moved longitudinally of itself and secured in its various adjusted positions, the securement being dependent upon the tightening of the nut 19. A metallic chute 20, which is made preferably of brass and is provided with side flanges 21, extends from the knife 11 and is adapted to receive the pineapple meat and discharge it on to a suitable conveyer belt or into a receptacle, if desired. This chute is pivoted at its lower end at 20' to the side bars 1, and its upper end is adjustably supported by brackets 22, so that this end of the chute may be raised or lowered with the raising and lowering of the knife.

In order that the shells may be properly flattened out and held to the conveyer belt 9 before and while the meat is being removed therefrom, a series of vertically arranged vanes 23 is arranged above the belt, the members of which series are supported by a frame 24, being secured thereto, in any suitable manner, such as by brackets 25, and being tied together by suitable bolts 26. This frame 25 is provided with a cover 27 and with depending arms 28, which have vertical slots 29 in their lower ends, as disclosed in Fig. 1. This frame 25 is supported by standards 30 which extend upwardly from the side bars 1 and are provided with bolts 31 which extend through the slots 29 and permit the vertical movement of the frame, together with the vanes 23 which it carries when they are loose, but secure the frame in its various adjusted positions when they are tightened. Thus the distance of the lower edges of the vanes 23 from the surface of the upper lap of the convyer belt 9 may be varied, but it is to be particularly noted that, normally, the lower edges of these vanes are below the plane of the knife 11. Opposing these vanes 23 is a supporting table 32, which is arranged beneath the upper lap of the conveyer belt directly under the vanes, and thus supports the belt as it passes toward the drum 6. These vanes 23 are cut away at the feed end of the machine to facilitate the passage of the pineapple shells beneath the same and act to flatten the shells and hold them to the conveyer belt, so that the meat adhering to the shells will be properly presented to the knife 11 and may thus be removed by the knife, without the removal of the eyes or particles of the shells.

A suitable conveyer 33 is secured, at 34, to the legs 2 of the machine and is arranged to receive the shells as they pass from the conveyer belt 9, and to convey them to a suitable receptacle.

The operation of the machine is as follows:—After the shells have been split the operator places them upon the conveyer belt 9, as the belt passes over the drum 3, at which time, they will be engaged by the spurs thereon. These shells are placed upon the conveyer belt with the meat side up, and as they pass beneath the vanes 23, they will be forced against the belt by the vanes and completely flattened, so that the meat will be exposed to the action of the knife 11. As the shells pass into contact with the knife, the meat will be cut therefrom in a large piece, and because of the fact that the knife is disposed angularly with relation to the line of travel of the shells, the eyes will not be pulled from the shells, and as the meat side is uppermost, particles of the shell will not become mixed with the meat. As the meat is severed from the shell, it will pass over the knife on to the chute 20, and thence to the receiving conveyer or receptacle. The shell, on the other hand, will pass on the conveyer belt 9 beneath the knife and the chute 20 into the shell conveyer 33 to a suitable receptacle. Thus, it will be seen that the meat, in effect, will be cut from the shell and lifted away from the same, while the shell will drop. This will insure not only the removal of the meat from the shell in a large piece, but also in the removal of the meat in a very desirable state, that is to say, free from eyes, dirt or particles of the shell. The ultimate product will, therefore, be clean and of a high grade, so that it may be later treated in any desired or known manner.

It is to be noted that the knife is adjustable, together with the vanes 23, so that meat of any desired thickness may be removed from the shells, which is, of course, a very essential and desirable feature, since the nature of the shells vary to a considerable extent, and since it is, therefore, possible to remove the meat of one thickness from one set of shells, and of another thickness from a separate set of shells.

It will be obvious that numerous changes may be made in the embodiment of the invention illustrated, and it is not desired to limit to any greater extent than is necessary by the claims, for the particular embodiment is chosen merely for the convenience of illustration.

What is claimed is:—

1. In a machine for removing the meat from pineapple shells, the combination with a stationary knife, of a conveyer for presenting the shells to the knife, the knife being substantially parallel to the surface of the conveyer, and means for retaining the shells in a flattened condition with the meat side uppermost during said presentation.

2. In a machine for removing the meat from pineapple shells, the combination with a substantially horizontal stationary knife, of a conveyer for presenting pineapple shells to the knife, means for retaining the shells in a flattened condition with the meat side uppermost during said presentation, and means for receiving the meat from the knife.

3. In a machine for removing the meat from pineapple shells, the combination with a substantially horizontal stationary knife, of a conveyer for presenting pineapple shells to the knife, means for retaining the shells in a flattened condition with the meat side uppermost during said presentation, means for receiving the meat from the knife, the said conveyer being operable to thereafter carry the shells downwardly.

4. In a machine of the class described, the combination with a conveyer for moving pineapple shells with their meat sides uppermost, vanes operating on the meat sides of the shells for flattening the same against the conveyer, and a knife disposed diagonally with respect to the line of movement of the shells for cutting the meat from the shells.

5. In a machine of the class described, the combination with a conveyer, of a knife extending transversely across the same, which knife is adjustable to and away from the conveyer, and a chute leading from the knife and adjustable to and away from the conveyer.

6. In a machine of the class described, the combination with a conveyer, of a knife extending transversely across the same, which knife is adjustable to and away from the conveyer, a chute leading from the knife and adjustable to and away from the conveyer, and a set of vanes arranged in advance of the knife.

7. In a machine of the class described, the combination with a conveyer, of a knife extending transversely across the same, which knife is adjustable to and away from the conveyer, a chute leading from the knife and adjustable to and away from the conveyer, and a plurality of vanes arranged in advance of the knife and adjustable to and away from the conveyer.

8. In a machine of the class described, the combination with a conveyer belt, of means for supporting the upper reach thereof, a knife extending transversely of the belt, and a plurality of vanes arranged above said upper reach and adapted to penetrate the pineapple meat and flatten the shells against said reach.

In testimony whereof I affix my signature.

GEORGE EDWIN FISHER.